(12) United States Patent
Fukuzumi et al.

(10) Patent No.: US 9,959,173 B2
(45) Date of Patent: May 1, 2018

(54) NODE, ARITHMETIC PROCESSING DEVICE, AND ARITHMETIC PROCESSING METHOD

(71) Applicant: FUJITSU LIMITED, Kawasaki-shi, Kanagawa (JP)

(72) Inventors: Norihiko Fukuzumi, Ashigarasimogun (JP); Makoto Hataida, Yokohama (JP); Seishi Okada, Kawasaki (JP); Jin Takahashi, Bunkyo (JP)

(73) Assignee: FUJITSU LIMITED, Kawasaki (JP)

( * ) Notice: Subject to any disclaimer, the term of this patent is extended or adjusted under 35 U.S.C. 154(b) by 68 days.

(21) Appl. No.: 15/172,212

(22) Filed: Jun. 3, 2016

(65) Prior Publication Data

US 2017/0017549 A1    Jan. 19, 2017

(30) Foreign Application Priority Data

Jul. 16, 2015 (JP) ................................. 2015-141842

(51) Int. Cl.
| | |
|---|---|
| *G06F 11/14* | (2006.01) |
| *H04L 12/24* | (2006.01) |
| *H04L 12/26* | (2006.01) |
| *G06F 11/20* | (2006.01) |

(52) U.S. Cl.
CPC .......... *G06F 11/142* (2013.01); *G06F 11/202* (2013.01); *H04L 41/0686* (2013.01); *H04L 43/0817* (2013.01); *G06F 2201/805* (2013.01); *G06F 2201/85* (2013.01)

(58) Field of Classification Search
CPC . G06F 11/142; H04L 41/0686; H04L 43/0817
See application file for complete search history.

(56) References Cited

U.S. PATENT DOCUMENTS 5,796,937 A * 8/1998 Kizuka ............... G06F 11/2035
                                                    714/11
6,163,831 A * 12/2000 Kermani ................. G06F 13/18
                                                    710/244

(Continued)

FOREIGN PATENT DOCUMENTS

| | | |
|---|---|---|
| JP | 06-152612 | 5/1994 |
| JP | 2002-259264 | 9/2002 |

(Continued)

*Primary Examiner* — Yolanda L Wilson
(74) *Attorney, Agent, or Firm* — Fujitsu Patent Center

(57) ABSTRACT

A node includes: an arithmetic processing device; and a first memory, wherein the arithmetic processing device includes: a processor core; a storing circuit to store a first failure node list in which first information indicating that a failure has occurred or second information indicating that no failure has occurred is set for each of nodes; a request issuing circuit to issue a first request to a second memory provided at a first node among the nodes; a setting circuit to set the first information for the first node in the first failure node list when the first request has timed out; and an issuance inhibition circuit to inhibit, based on a second request to the second memory from the processor core, the second request from being issued by the request issuing circuit when the first information is set for the first node in the first failure node list.

18 Claims, 15 Drawing Sheets

(56) References Cited

U.S. PATENT DOCUMENTS

| | | | | |
|---|---|---|---|---|
| 2006/0023625 A1* | 2/2006 | Ikawa | ............... | G06F 11/2005 370/216 |
| 2013/0170334 A1* | 7/2013 | Koinuma | ............ | G06F 11/0724 370/216 |
| 2013/0227224 A1* | 8/2013 | Koinuma | ............ | G06F 11/1048 711/152 |
| 2014/0335881 A1* | 11/2014 | Rubin | ................. | H04W 28/20 455/452.1 |
| 2014/0380085 A1* | 12/2014 | Rash | ................. | G06F 11/0772 714/3 |

FOREIGN PATENT DOCUMENTS

| | | |
|---|---|---|
| JP | 2006-039897 | 2/2006 |
| JP | 2013-140445 | 7/2013 |
| JP | 2013-182355 | 9/2013 |

\* cited by examiner

NODE, ARITHMETIC PROCESSING DEVICE, AND ARITHMETIC PROCESSING METHOD

CROSS-REFERENCE TO RELATED APPLICATION

This application is based upon and claims the benefit of priority of the prior Japanese Patent Application No. 2015-141842, filed on Jul. 16, 2015, the entire contents of which are incorporated herein by reference.

FIELD

The embodiment discussed herein is related to a node, an arithmetic processing device, and an arithmetic processing method.

BACKGROUND

For symmetric multi-processors (SMPs), a main storage unit is shared among multiple arithmetic processing devices.

A related technology is disclosed in Japanese Laid-open Patent Publication Nos. 2013-182355, 2013-140445, 2002-259264, 6-152612, or 2006-39897.

SUMMARY

According to an aspect of the embodiments, a node includes: an arithmetic processing device; and a first memory, wherein the arithmetic processing device includes: a processor core; a storing circuit configured to store a first failure node list in which first information indicating that a failure has occurred or second information indicating that no failure has occurred is set for each of a plurality of nodes; a request issuing circuit configured to issue a first request to a second memory provided at a first node among the plurality of nodes; a setting circuit configured to set the first information for the first node in the first failure node list in a case where the first request has timed out; and an issuance inhibition circuit configured to inhibit, based on a second request to the second memory from the processor core, the second request from being issued by the request issuing circuit in a case where the first information is set for the first node in the first failure node list.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

An information processing system in which multiple nodes including arithmetic processing devices and main storage devices are connected by the same bus and each of the arithmetic processing devices shares each of the main storage devices is an example of an information processing system to which an SMP technology is applied. For example, in such an information processing system, coherency of data cached by arithmetic processing devices of individual nodes is maintained by using a directory method.

In an SMP, multiple nodes are treated as a single partition. Therefore, a failure in one node causes all the other nodes to go down. In order to reduce a range affected by such an error, a shared memory system is provided.

For example, a technique for reducing the possibility that an information processing apparatus goes down is provided. For example, a technique is provided for reducing a range affected by an error in the case where an abnormality regarding data transfer between nodes occurs. For example, a technique is provided for suppressing a degradation of the performance of data transmission to a terminal in a system in which data is transmitted from a server to multiple terminals. For example, a technique is provided for avoiding, in a case where a control device sequentially performs polling to multiple terminals, a degradation of a service to a different terminal and monitoring the terminal so that quick recovery is achieved. For example, a technique is provided for avoiding system down even when a failure occurs in a single crossbar switch in a system which performs data transfer between nodes using a crossbar switch between nodes.

For example, in the case where a CPU (arithmetic processing device) of a certain node transmits a request to a different node, no response may be made to the request due to a failure in the different node. As a result, the request times out, and the processing monitoring time of the CPU may be exceeded or the resources within the CPU may run out. For example, even if there is no failure in a node which has issued a request, the node may go down. For example, in a shared memory system, a certain node may be inhibited from going down due to a failure in a different node.

Hereinafter, corresponding elements in multiple drawings are referred to with the same reference signs.

Figure 1:
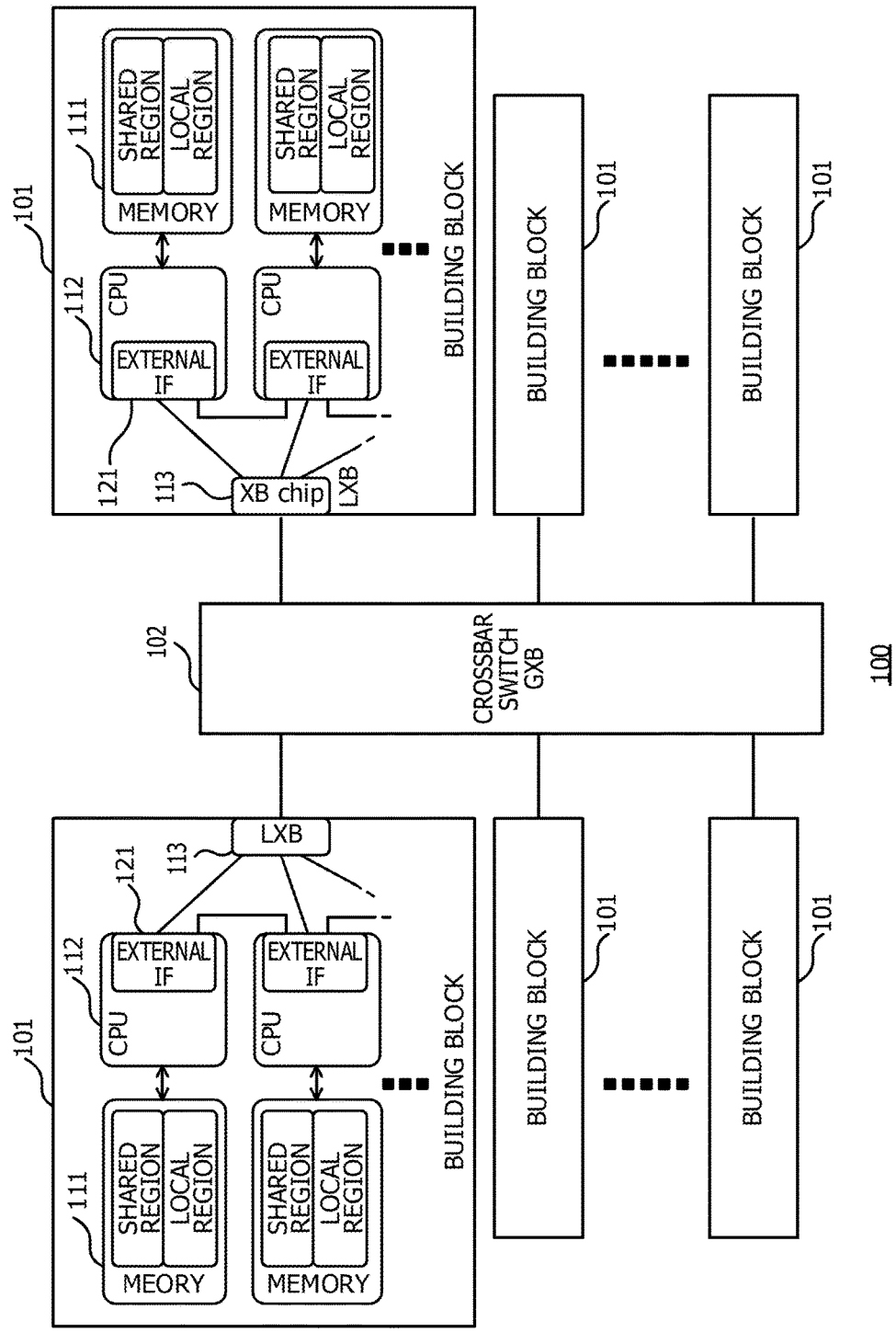
FIG. 1 illustrates an example of a shared memory system.

FIG. 1 illustrates an example of a shared memory system. A shared memory system 100 includes, for example, multiple building blocks (BBs) 101 and a crossbar switch 102. The building blocks 101 are connected to one another via the crossbar switch (GXB) 102. In the shared memory system 100, for example, the building blocks 101 operate as nodes. The building blocks 101 each include, for example, a memory 111, a CPU 112 (arithmetic processing device), and a crossbar chip (LXB) 113. Each of the building blocks 101 may include multiple memories 111 and multiples CPUs 112 or may include a single memory 111 and a single CPU 112. The CPU 112 includes, for example, an external interface (IF) 121, which is an interface with the outside of the CPU 112. The CPU 112 is connected to other CPUs 112 within the same building block 101 via the external interface 121. The CPU 112 is connected to CPUs 112 within different building blocks 101 via the crossbar switch 102. The individual CPUs 112 are connected to the corresponding memories 111. Each of the memories 111 includes, for example, two regions, that is, a local region which may be used only by the CPUs 112 within the same building block 101 and a shared region which may also be used by the CPUs 112 within different building blocks 101.

Figure 2:
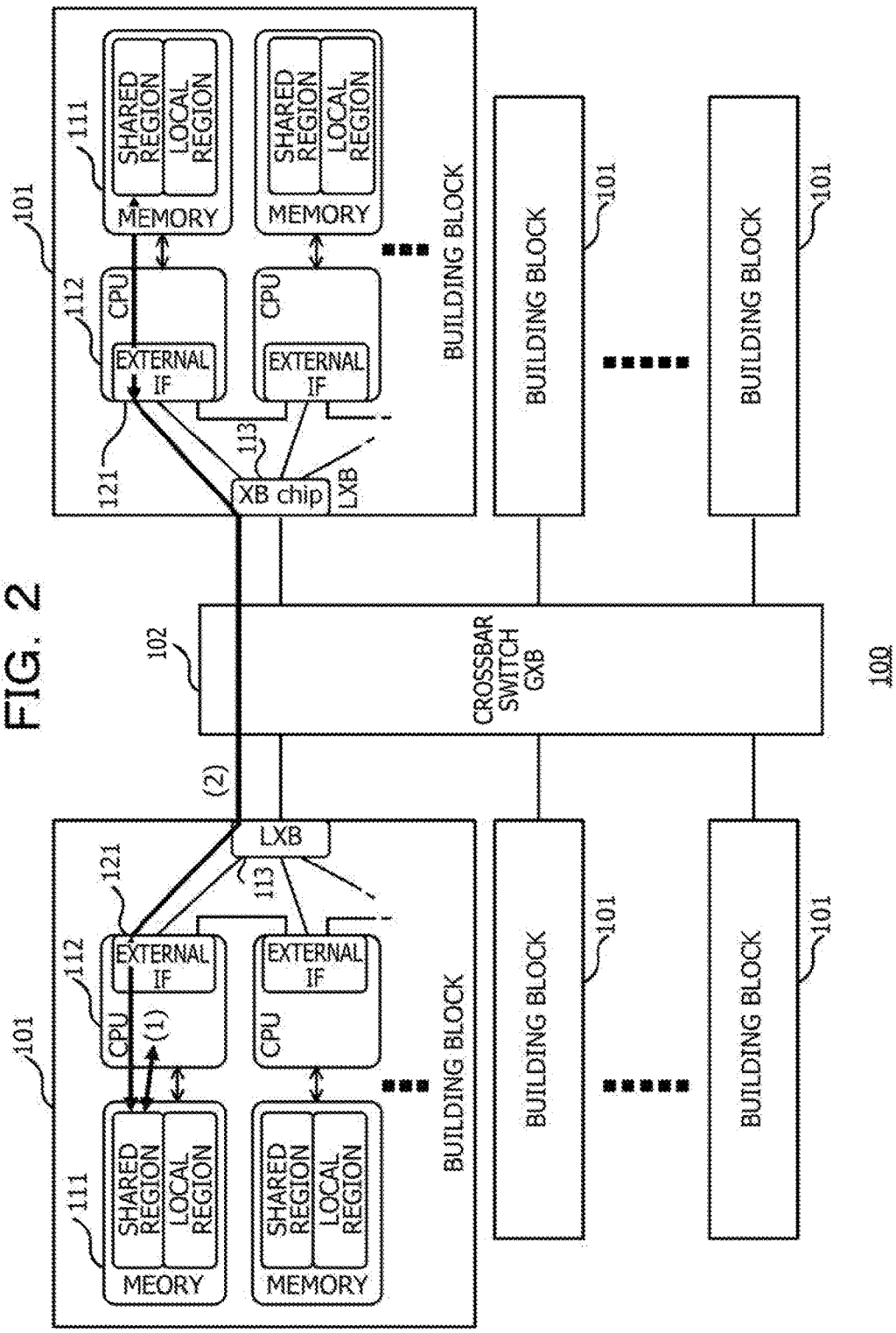
FIG. 2 illustrates an example of an operation of the shared memory system.

FIG. 2 illustrates an example of an operation of the shared memory system. For example, it is assumed that, in the case where a certain CPU 112 accesses a shared region of a memory 111 within the same building block 101, entity data of the accessed shared region exists in a shared region of a memory 111 within a different building block 101 ((1) of FIG. 2). In this case, the CPU 112 transmits a request to the different building block 101 that includes the entity data of the shared region, and acquires data as a response to the request ((2) of FIG. 2). Access to the memory 111 may be processed while maintaining cache coherency.

Regarding transmission of requests, the sequence is controlled by a pipeline inside the CPU 112. For example, a wait time is set for a request so that having to wait for a response may be avoided in the case where no response is made to a transmitted request. For example, no response is made to a request within the wait time, the request times out. For example, timeout of a request may be set not to be treated as an unrecoverable error but to be treated as a recoverable error. For example, setting may be performed such that, even if a request which has been issued from the CPU 112 of a certain building block 101 to a different building block 101 times out, the building block 101 does not go down due to the timeout of the request. Even in this case, if a response to the request is not received within the processing monitoring time of the CPU 112, the building block 101 may be reset or forcibly stopped, and the building block 101 may go down. The processing monitoring time of the CPU 112 may be, for example, a watchdog timer, and may be set to, for example, about one second. As described above, even in the case where the building block 101 is in a normal operation state, the building block 101 may go down because of timeout of a request which has been transmitted to the different building block 101.

Figure 3:
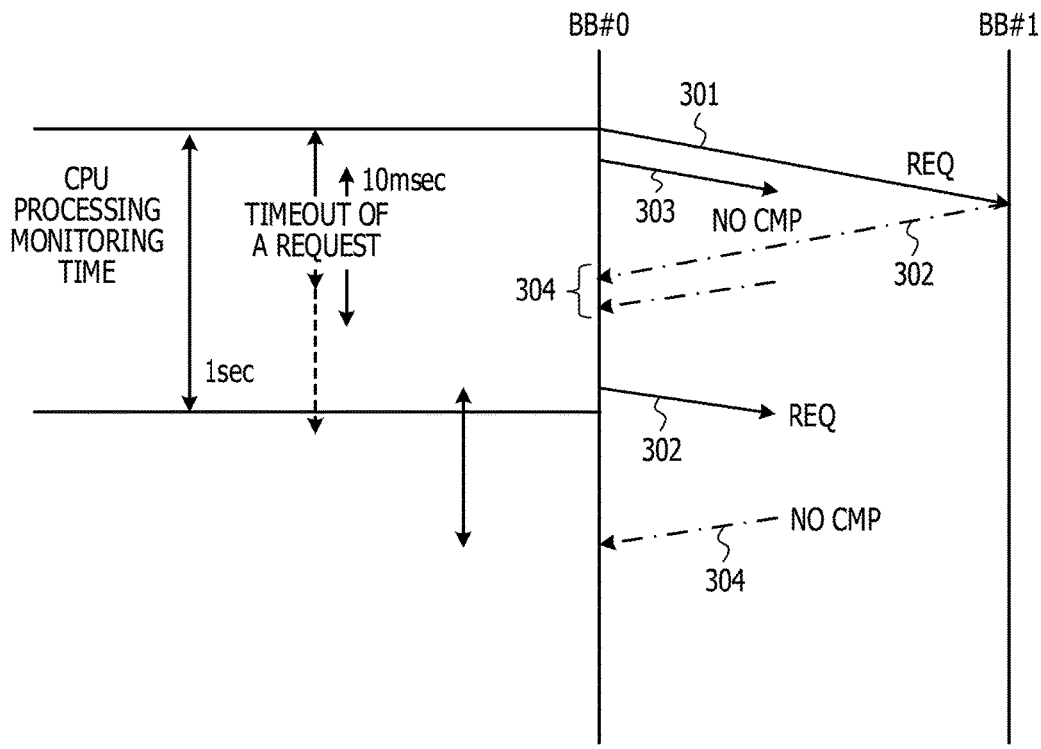
FIG. 3 illustrates an example of timeout of a request and node down in the shared memory system.

FIG. 3 illustrates an example of timeout of a request and node down in the shared memory system. For example, it is assumed that the CPU 112 in a building block #0 (BB#0) accesses a shared region of the memory 111 within the same building block, and entity data of the accessed shared region exists in a shared region of the memory 111 in a different building block #1 (BB#1). In this case, the CPU 112 of the building block #0 transmits a request to the different building block #1 which includes the entity data of the shared region, and acquires data as a response to the request. For example, there may be a failure in the building block #1 to which the request is transmitted. In this case, although the CPU 112 of the building block #0 transmits a request to the building block #1 in which a failure has occurred (301 of FIG. 3), no response to the request is transmitted from the building block #1 in which the failure has occurred (302 of FIG. 3). During the time waiting for a response, a request to the building block #1 in which the failure has occurred may be generated separately (303 of FIG. 3). In this case, requests waiting for a response may be accumulated (304 of FIG. 3).

In the case where a request transmitted to the building block #1 in which the failure occurs has timed out, the processing monitoring time of the CPU may also time out, and even in a normally operable state, the building block #0 may go down. For example, in the case where timeout of a request occurs multiple times and requests for a response are accumulated, resources within the CPU 112 may run out, and a normal node may slow down and turn into an abnormal node. For example, the number of instructions that may be executed at the same time by the CPU 112 is limited, and therefore if processing is not released by timeout or the like, resources of the CPU 112 may run out. In the case where a certain node transmits a request to a different node, when a response is not received due some abnormality, even if the node that has transmitted the request is normal, the normal node may go down or may turn into an abnormal node. Therefore, for example, in the shared memory system, a situation in which a certain node goes down due to a failure in a different node may be suppressed.

Figure 4:
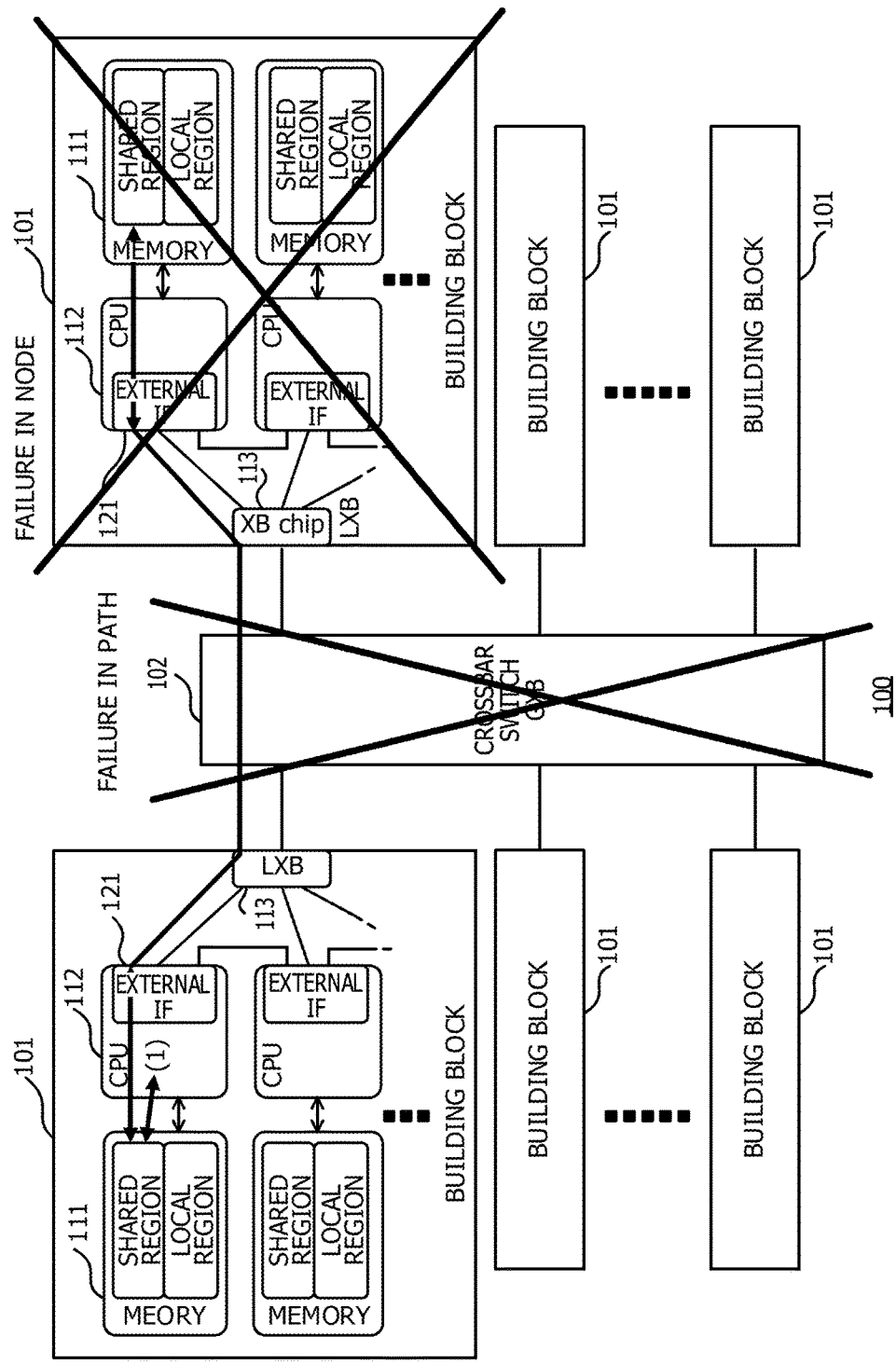
FIG. 4 illustrates an example of a failure in a building block and a failure in a path.

FIG. 4 illustrates an example of a failure in a building block and a failure in a path. For example, the reason why no response is made to a request transmitted by the CPU 112 of the building block 101 may be a failure occurring in a path which connects building blocks as well as a failure occurring in the building block 101. However, it is difficult to identify, based on timeout of the request, whether the location at which the failure has occurred is the building block to which the request has been transmitted or the path connecting building blocks. For example, in the case where timeout of a request has occurred, control for inhibiting a request from being issued to a transmission destination node at which timeout of the request has occurred may be performed by determining that a failure has occurred in the node to which the request has been transmitted. In this case, for example, all the transmission destination nodes to which a request is to be transmitted through the same path may be determined to be failure nodes. For example, even if communication may be continued by degenerating the failure path, communication with the transmission destination nodes may be inhibited. Therefore, for example, in the case where timeout of a request has occurred, it may be rapidly identified whether a failure has occurred in a node to which the request has been transmitted or in a path.

Figure 5:
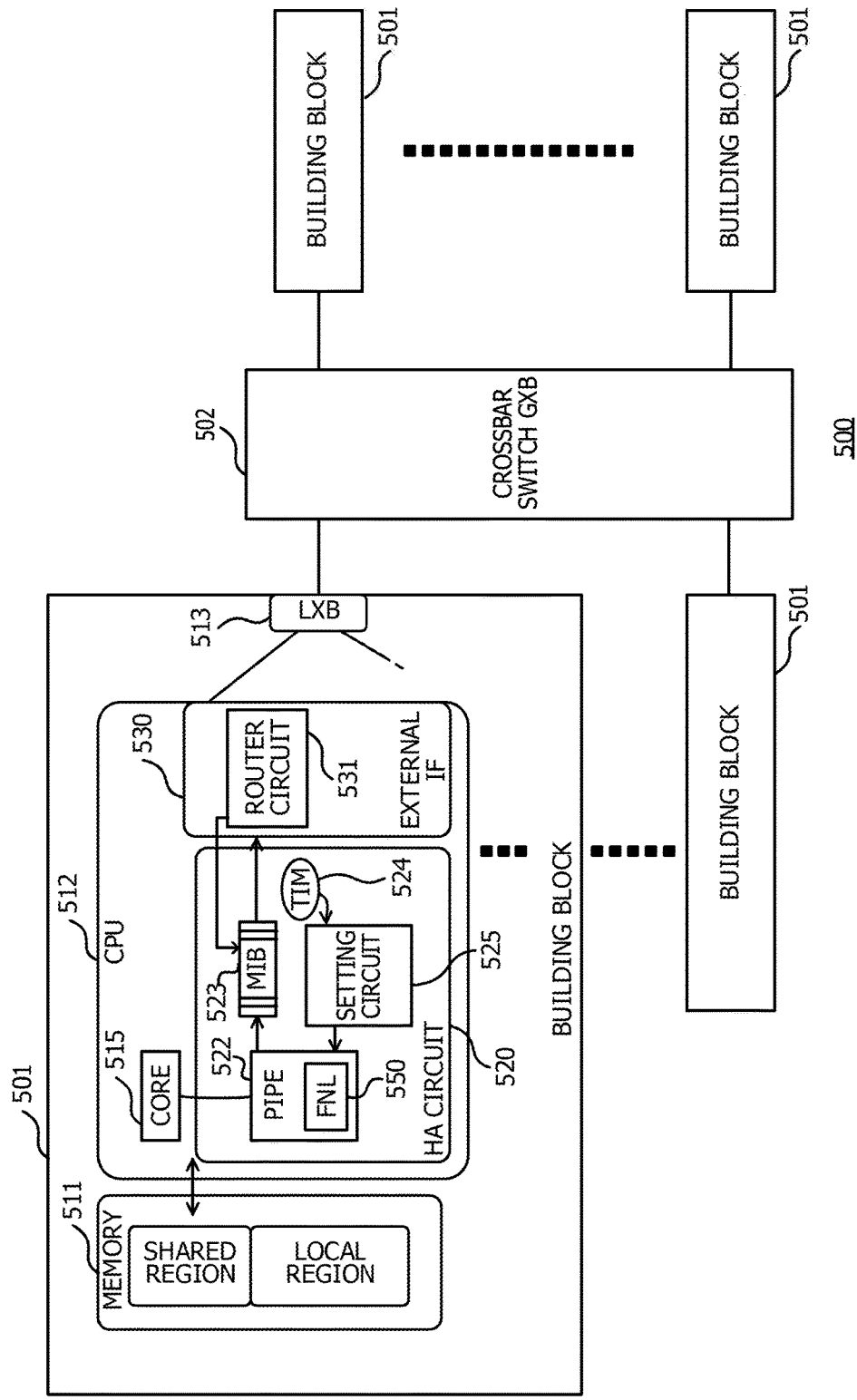
FIG. 5 illustrates an example of an information processing system.

FIG. 5 illustrates an example of an information processing system. In FIG. 5, an information processing system 500 includes multiple building blocks (BBs) 501 and a crossbar switch (GXB) 502. The building blocks 501 each include a memory 511, a CPU (arithmetic processing device) 512, and a crossbar chip (LXB) 513. Each of the building blocks 501 may include multiple memories 511 and multiple CPUs 512 or may include a single memory 511 and a single CPU 512. In the information processing system 500, for example, the building blocks 501 may operate as nodes. The information processing system 500 may be, for example, a shared memory system which adopts a directory method, and may maintain coherency of data cached by the CPUs 512 of individual nodes by using the directory method.

The CPU 512 includes a core 515, a home agent (HA) circuit 520, and an external interface 530. The core 515 may be, for example, a processor core of the CPU 512. The home agent circuit 520 includes, for example, a pipe (PIPE) 522, a request issuing circuit 523 including a move-in buffer (MIB) and the like, a timer (TIM) 524, and a setting circuit 525.

The pipe 522 includes, for example, a storing circuit which holds a node map and a failure node list (FNL) 550, and controls permission or prohibition of access to a different node. In the failure node list 550, for example, nodes included in the information processing system 500, for example, failure information which indicates occurrence of a failure, is set in a case where a failure has occurred in the building block 501. Failure information may be, for example, the value of a flag which indicates that a failure has occurred in a node. For example, in the case where a failure has occurred in a certain node, a failure node flag which corresponds to the node may be set to logical "1" in the failure node list 550. For example, in the case where a certain node operates normally, the failure node flag may be set to logical "0". The request issuing circuit 523 includes, for example, a buffer and a register for allowing the CPU 512 to control a request, and issues a request. The timer 524 monitors the period from a point in time when the request issuing circuit 523 issues a request to a point in time when a response is received. The setting circuit 525 sets a failure node flag in the failure node list 550.

The external interface (IF) 530 is an interface which allows communication with a different CPU 512. The external interface 530 includes, for example, a router (RT) circuit 531. For example, the router circuit 531 outputs a request to the crossbar chip 513 and executes degeneration of a communication path. The router circuit 531 includes a router common circuit 902 and a router port unique circuit 903 which is provided for each path.

Figure 6:
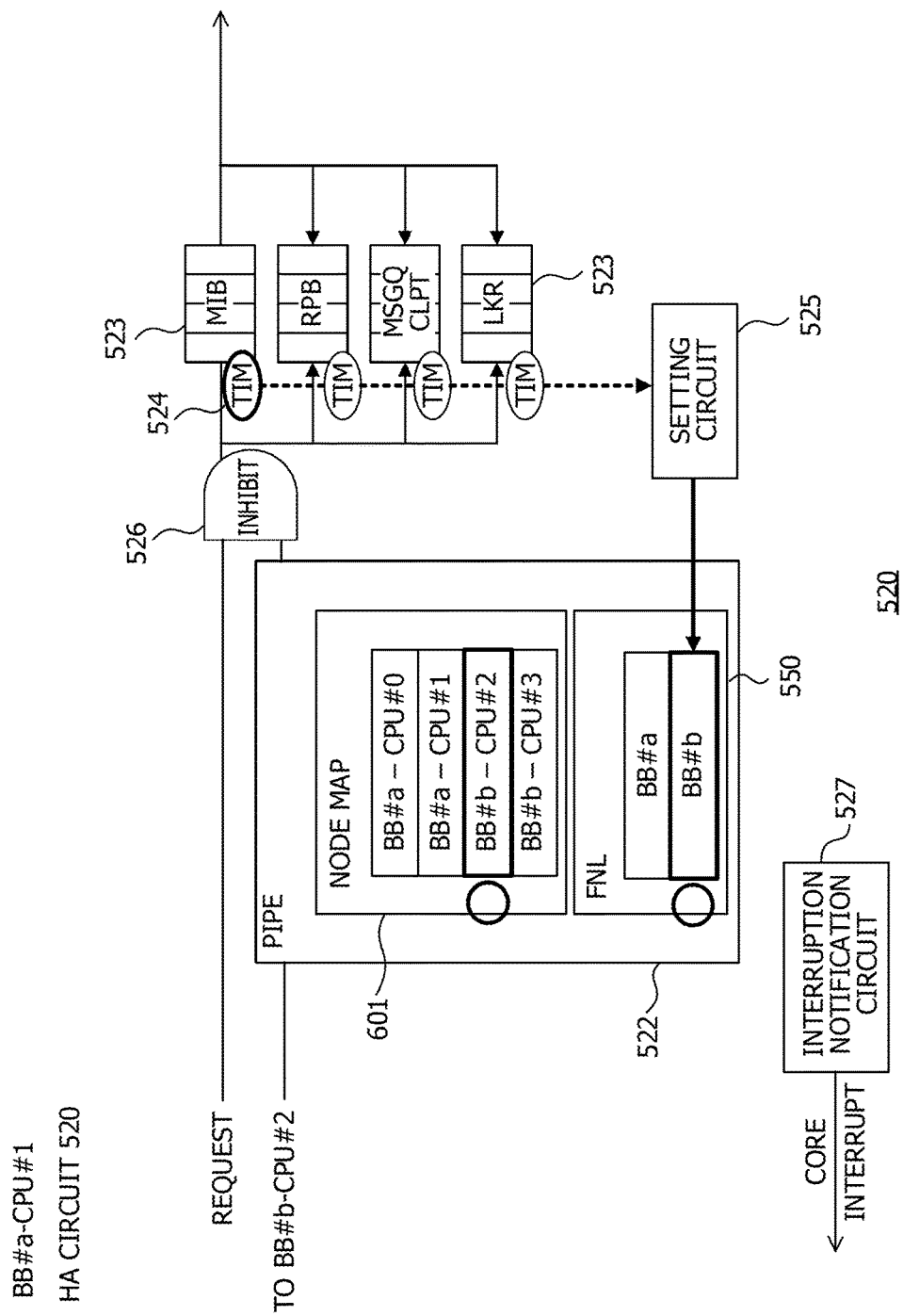
FIG. 6 illustrates an example of issuance and inhibition of a request by a home agent circuit.

FIG. 6 illustrates an example of issuance and inhibition of a request by the home agent circuit. For example, the home agent circuit 520 may be arranged within the CPU 512 of FIG. 5. The home agent circuit 520 includes, for example, the pipe 522, the request issuing circuit 523, the timer 524, the setting circuit 525, an issuance inhibition circuit 526, and an interruption notification circuit 527. The pipe 522 includes, for example, a storing circuit which stores a node map 601 and the failure node list 550, and controls permission and prohibition of access to a different node. The request issuing circuit 523 includes, for example, a buffer and a register. In FIG. 6, the request issuing circuit 523 includes buffers including a move-in buffer (MIB), a replacement buffer (RPB), a buffer for message transmission/reception (MSGQ) and cleanse control (CLPT), a lock register (LKR), and the like. Requests may be assigned to corresponding buffers of the request issuing circuit 523.

For example, issuance and inhibition of a request input from the core 515 may be controlled using the failure node list 550, as described below. For example, a CPU #1 of a building block #a accesses a shared region of the memory 511 of the CPU 512 #2 of a different building block 501 #b. In this case, the core 515 outputs a request to the issuance inhibition circuit 526, and inputs to the pipe 522 address information which indicates the CPU 512 #2 of the building block 501 #b, which is a request transmission destination. The pipe 522 stores, for example, a node map which indicates nodes operating within the information processing system 500 and the CPUs 512. When address information is input, the pipe 522 refers to the node map, and confirms whether or not the CPU 512 #2 of the accessed building block 501 #b is included in the information processing system. Furthermore, the pipe 522 refers to the failure node list 550, and confirms whether or not a failure node flag which corresponds to the accessed node is set to logical "1". For example, it is assumed that the CPU 512 #2 of the accessed building block 501 #b is included in the node map and the failure node flag which corresponds to the accessed node indicates logical "0". In this case, the pipe 522 does not output an inhibition signal, which is provided for inhibiting a request from being output, to the issuance inhibition circuit 526. The request output from the core 515 is not inhibited by the issuance inhibition circuit 526, and a request is issued by the request issuing circuit 523. In contrast, in the case where the CPU 512 #2 of the accessed building block 501 #b is not included in the node map or the failure node flag which corresponds to the accessed node indicates logical "1", the pipe 522 outputs an inhibition signal. Therefore, the request output from the core 515 is, for example, inhibited by the issuance inhibition circuit 526, and the request issuing circuit 523 does not issue a request. Thus, by setting logical "1" in the failure node list 550, a request may be inhibited from being issued from the request issuing circuit 523. The issuance inhibition circuit 526 may include, for example, a logical circuit: AND.

When a request is input, the request issuing circuit 523 issues a request for accessing a shared region of the memory 511 of the accessed CPU 512, and activates the timer 524. It is assumed that after the request issuing circuit 523 issues a request, no response to the request is received, and the timer 524 has timed out. In this case, the interruption notification circuit 527 outputs an interruption notification to the core 515 to reset, for example, release monitoring for a processing monitoring time of the CPU, regarding the request which has timed out. The interruption notification circuit 527 may, for example, generate, in a pseudo manner, a notification, as an interruption notification, which indicates that a response has been normally received from a transmission destination node and output the notification to the core 515. Accordingly, the timer which counts the processing monitoring time of the CPU is reset. A situation in which timeout of the request causes the processing monitoring time of the CPU to time out and the building block 501 from which the request has been transmitted goes down, may be avoided. In the case where a request has timed out, the setting circuit 525 sets the failure node flag in the failure node list 550 which corresponds to the node to which the request has been transmitted to logical "1". A new request to the node for which the failure node flag is set to logical "1" is inhibited by the issuance inhibition circuit 526. Therefore, after the failure node flag is set to logical "1", the request issuing circuit 523 is inhibited from issuing a request to the failure node. For example, in the case where a request is issued multiple times to a node from which no response is made, requests waiting for response are accumulated. In this case, for example, resources within the CPU 112 may run out, and a normal node may slow down and turn into an abnormal node. However, based on the failure node list 550, a request is inhibited from being issued to a failure node. Therefore, a situation in which the resources within the CPU 112 run out and a normal node slows down and turns into an abnormal node may be inhibited. For example, in the case where processing such as removal of a failure node from the information processing system 500 is completed and access to a normal node becomes possible, the failure node flag may be switched from logical "1" to logical "0" so that access may be resumed. In the case where timeout of a request has occurred, the interruption notification circuit 527 outputs an interruption notification to the core 515, and the timer for counting the processing monitoring time of the CPU is therefore reset. Thus, a situation in which timeout of the request causes the processing monitoring time of the CPU to time out and the building block 501 from which the request has been transmitted goes down may be inhibited.

Figure 7:
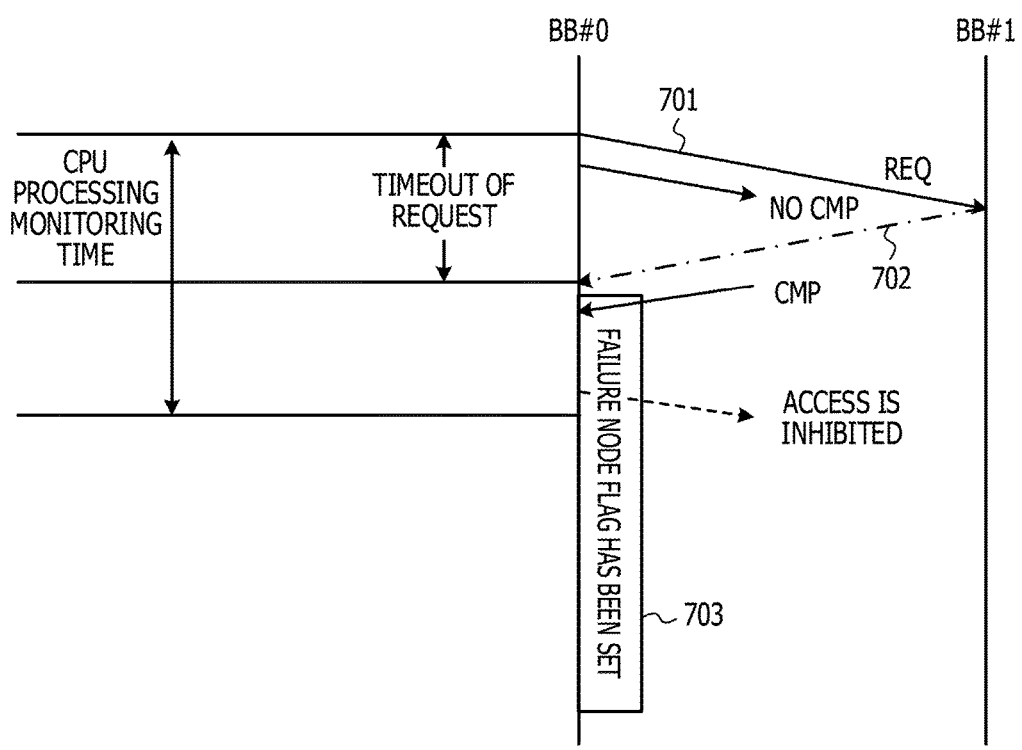
FIG. 7 illustrates an example of an operation for inhibiting issuance of a request in the information processing system.

FIG. 7 illustrates an example of an operation for inhibiting issuance of a request in the information processing system. For example, it is assumed that in the case where the CPU 512 of the building block #0 accesses a shared region of the memory 511 within the same building block #0, entity data of the accessed shared region exists in a shared region of the memory 511 in a different building block #1. In this case, the CPU 512 of the building block #0 transmits a request to the different building block #1 including the entity data of the shared region, and acquires data as a response to the request. For example, it is assumed that a failure has occurred in the building block #1 to which the request has been transmitted. In this case, the CPU 512 of the building block #0 transmits a request to the building block #1 in which the failure has occurred (701 of FIG. 7). However, no response to the request is received from the building block #1 in which the failure has occurred, and timeout of the request occurs (702 of FIG. 7). In this case, the CPU 512 of the building block #0 sets a failure node flag in the failure node list 550 which corresponds to the building block #1 to which the request has been transmitted to logical "1". Therefore, after that, a new request is inhibited from being issued to the building block #1 (703 of FIG. 7). Thus, a situation in which requests waiting for a response are accumulated may be inhibited, and for example, a situation in which resources within the CPU 112 run out and a normal node slows down and turns into an abnormal node may be inhibited. Regarding the request that has timed out, the interruption notification circuit 527 transmits an interruption notification to the core 515, and therefore the timer for counting the processing monitoring time of the CPU 512 is reset. Accordingly, a situation in which timeout of the request causes the processing monitoring time of the CPU to time out and the building block 501 from which the request has been transmitted goes down may be inhibited.

For example, based on the failure node list 550, the CPU 512 of the building block #0 inhibits a request from being issued to the building block building block #1. For example, control using the failure node list 550 may also be performed when the CPU 512 of a certain building block 501 receives a request from a different building block 501 and a response to the request is made. When the CPU 512 of a certain building block 501 receives a request from a different building block 501, data as a target of the request may be taken out to another building block 501. In such a case, the CPU 512 of the building block 501 which has received the request issues a request (cache request) to the building block 501 to which the data as the target of the request has been taken out. As described above, a request for the case where a further request is issued to a building block 501 to which data has been taken out may be referred to as an order. Control using the failure node list 550 may also be performed for transmission and reception of an order.

Figure 8:
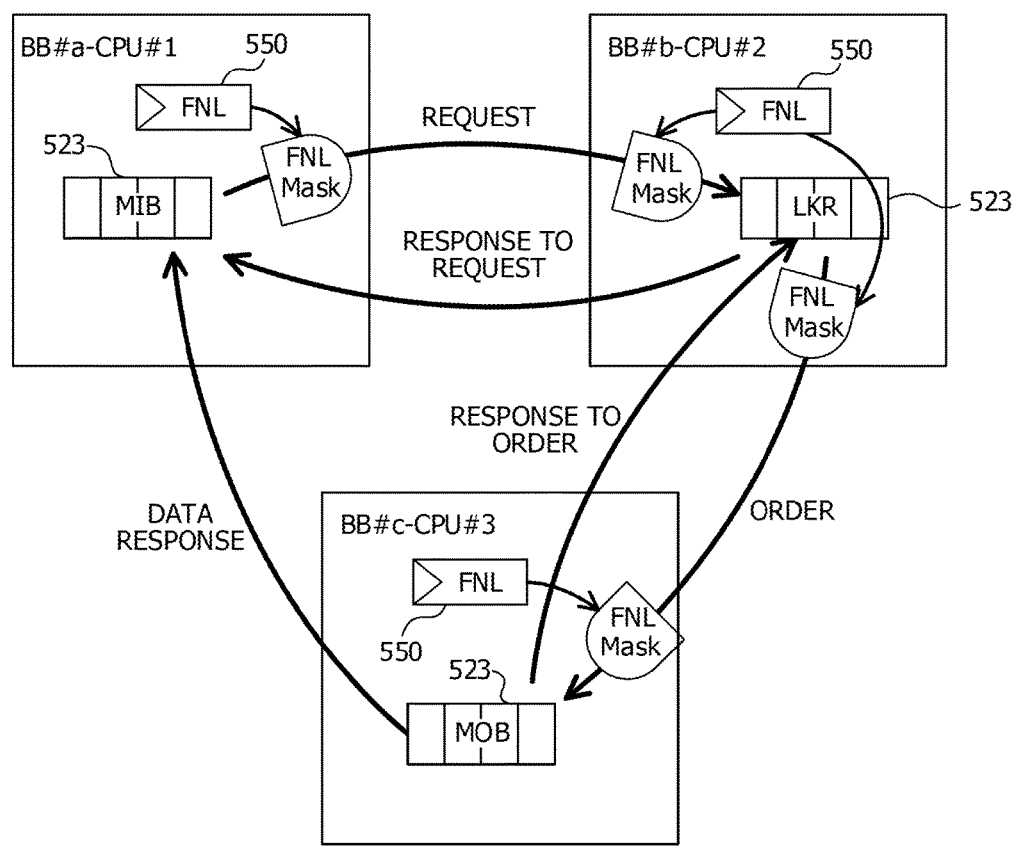
FIG. 8 illustrates an example of issuance and issuance inhibition of a request and an order based on a failure node list.

FIG. 8 illustrates an example of issuance and issuance inhibition of a request and an order based on a failure node list. In FIG. 8, the failure node list 550 is referred to when a load instruction is executed. In FIG. 8, CPUs included in three different nodes BB#a-CPU#1, BB#b-CPU#2, and BB#c-CPU#3 are illustrated. For example, in the case where a request is transmitted from the BB#a-CPU#1 to the BB#b-CPU#2, the BB#a-CPU#1 confirms that a failure node flag which corresponds to the BB#b-CPU#2 as a request transmission destination is not set to logical "1". In the case where the BB#b-CPU#2 transmits a response to the request received from the BB#a-CPU#1, the BB#b-CPU#2 confirms that a failure node flag which corresponds to the BB#a-CPU#1 is not set to logical "1". For example, data requested in the received request may be taken out to a different BB#c-CPU#3. In this case, the BB#b-CPU#2 confirms that a failure node flag which corresponds to the BB#c-CPU#3 to which data has been taken out is not set to logical "1". If the failure node flag which corresponds to the BB#c-CPU#3 is not set to logical "1", an order (cache request) is transmitted to the BB#c-CPU#3. In the case where the BB#c-CPU#3 transmits a response to the order received from the BB#b-CPU#2, the BB#c-CPU#3 refers to the failure node list 550 to confirm that a failure node flag which corresponds to the BB#b-CPU#2 does not indicate logical "1". In FIG. 8, during the period from issuance of a request by the BB#a-CPU#1 to reception of data, confirmation using the failure node list 550 is performed four times. For example, by performing control for inhibiting issuance of a request using the failure node list 550 multiple times for transmission and reception of a request and an order as described above, transmission of an unnecessary request to a failure node and an unnecessary response to the request may further be suppressed.

For example, in the case where timeout of a request has occurred, the timeout may be caused by a failure in a path. In this case, for example, communication may be maintained by degenerating the failure path. Therefore, in the case where a failure in a path is detected by the router circuit 531, the CPU 512 may inhibit setting of the failure node list 550. For example, even if timeout of a request has occurred, the CPU 512 may perform control such that setting of the failure node list 550 is not performed. In this case, for example, after a failure path is degenerated, the CPU 512 resumes access. Degeneration control for a path for the case where a failure occurs in the path and inhibition of setting of the failure node list 550 may be performed, for example, as described below.

Figure 9:
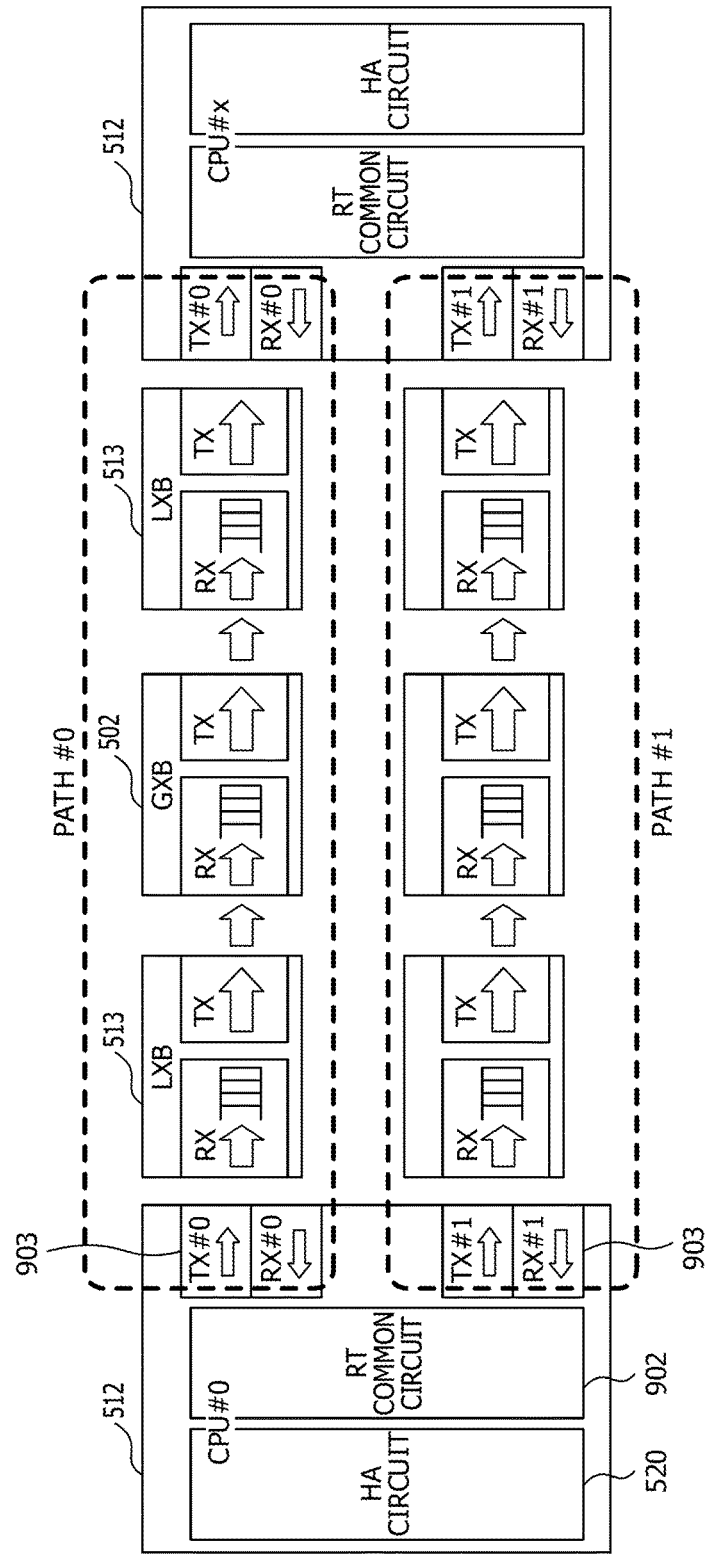
FIG. 9 illustrates an example of a configuration of paths which connect central processing units (CPUs)

FIG. 9 illustrates an example of a configuration of paths which connect the CPUs 512. In FIG. 9, the CPUs 512, the crossbar chips 513, and crossbar switches 502 are illustrated. Each of the CPUs 512 includes the home agent circuit 520, the router common circuit 902, and the router port unique circuit 903. The home agent circuit 520 accesses to the core 515 and the memory 511. The router common circuit 902 and the router port unique circuit 903 connect the CPU 512 to a path (way). The router port unique circuit 903 is provided for each path. The router common circuit 902 and the router port unique circuit 903 are included in the router circuit 531. A path may include the crossbar chip 513 and the crossbar switch 502. In FIG. 9, a path has a redundant configuration of two paths: a path #0 and a path #1. For example, in the case where a failure has occurred in one path, by degenerating the failure path, communication may be continued by using the other path.

Figure 10:
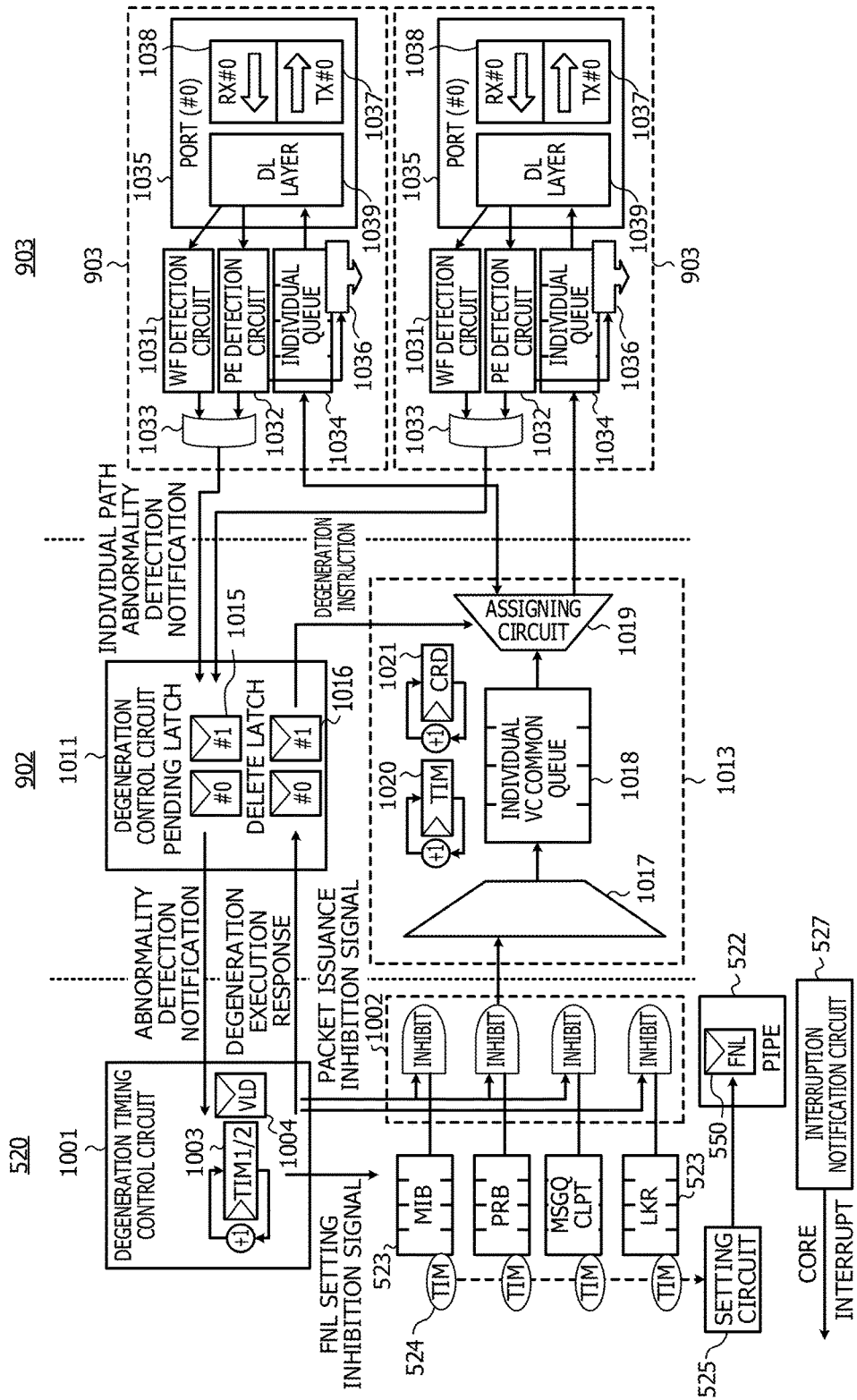
FIG. 10 illustrates an example of a home agent circuit, a router common circuit, and a router port unique circuit.

FIG. 10 illustrates an example of a home agent circuit, a router common circuit, and a router port unique circuit.

In FIG. 10, the home agent circuit 520 includes, for example, the pipe 522, the request issuing circuits 523, the timers 524, the setting circuit 525, the interruption notification circuit 527, a degeneration timing control circuit 1001, and a packet issuance inhibition control circuit 1002. Each of the request issuing circuits 523 includes, for example, a buffer and a register. In FIG. 10, the request issuing circuits 523 include buffers including a move-in buffer (MIB), a replacement buffer (RPB), a buffer for message transmission/reception (MSGQ) and cleanse control (CLPT), a lock register (LKR), and the like. The degeneration timing control circuit 1001 includes a drain timer 1003 and a valid (VLD) circuit 1004.

The router common circuit 902 includes, for example, a degeneration control circuit 1011 and an assignment controller 1013. The degeneration control circuit 1011 includes, for each path, a degeneration temporary holding (pending latch) unit 1015 and a degeneration holding (delete latch) unit 1016. When receiving an individual path abnormality detection notification which indicates an abnormality of a path from the router port unique circuit 903, the degeneration control circuit 1011 temporarily records information of abnormality detection for the path in the degeneration temporary holding unit 1015. When receiving the individual path abnormality detection notification, the degeneration control circuit 1011 outputs an abnormality detection notification which indicates occurrence of an abnormality in the path to the degeneration timing control circuit 1001 of the home agent circuit 520. When receiving a degeneration execution response, which is a response to the abnormality detection notification, from the degeneration timing control circuit 1001, the degeneration control circuit 1011 releases the abnormality of the path which is temporarily recorded in the degeneration temporary holding unit 1015, and stores the degeneration execution response in the degeneration holding unit 1016. The degeneration holding unit 1016 stores information of the degenerated path. When receiving the degeneration execution response, the degeneration control circuit 1011 instructs an assigning circuit 1019 of the assignment controller 1013 to perform degeneration.

The assignment controller 1013 includes, for example, a multiplexer 1017, a buffer 1018, the assigning circuit 1019, a timer 1020, and a credit circuit 1021, and controls which path a request is to be transmitted through. The multiplexer 1017 outputs a request which has been input from the packet issuance inhibition control circuit 1002 to the buffer 1018. For example, the buffer 1018 temporarily stores the input request, and outputs the request to the assigning circuit 1019. For example, the assigning circuit 1019 assigns the request to a path. The credit circuit 1021 is, for example, a circuit which manages exchange of credit with the crossbar switch 502. The timer 1020 is, for example, a timer for monitoring whether or not credit lent to the crossbar switch 502 has returned.

The CPU 512 includes, for each path, the router port unique circuit 903. In FIG. 10, two router port unique circuits 903 for a path #0 system and a path #1 system are illustrated. Each of the router port unique circuits 903 includes, for example, a path failure detection circuit (WF) 1031, a port error (PE) detection circuit 1032, an abnormality notification circuit 1033, a buffer 1034, a port 1035, and a disposal circuit 1036. The port 1035 includes, for example, a transmission port 1037, a reception port 1038, and a module circuit 1039. The reception port 1038 is, for example, a port at which data is received, and the transmission port 1037 is, for example, a port from which data is transmitted. The module circuit 1039 is a module which processes data in a data link layer.

For example, issuance of a request and issuance inhibition of a request for the case where no failure has occurred in a path will be described below. In the case where a path failure has occurred, the degeneration timing control circuit 1001 outputs an FNL setting inhibition signal to the request issuing circuit 523, and outputs a packet issuance inhibition signal to the packet issuance inhibition control circuit 1002 for a predetermined period of time. In the case where no path failure has occurred, the degeneration timing control circuit 1001 does not output an FNL setting inhibition signal or a packet issuance inhibition signal. In this case, when a request is input to the pipe 522 from the core 515, the failure node list 550 is referred to, and it is determined whether or not the node as a request transmission destination is a failure node, as described with reference to FIG. 6. For example, in the case where a failure node flag which corresponds to the node as the request transmission destination is set to logical "1", the node as the transmission destination is regarded as a failure node, and therefore the pipe 522 inhibits a request. In the case where the failure node flag is set to logical "0" and the node as the transmission destination is not a failure node, the pipe 522 inputs a request to the request issuing circuit 523. For example, the request issuing circuit 523 temporarily stores the input request in the buffer. Then, for example, the request issuing circuit 523 issues a request to the transmission destination node by outputting the request to the packet issuance inhibition control circuit 1002, and activates the timer 524.

For example, in the case where no packet issuance inhibition signal is input from the degeneration timing control circuit 1001, the packet issuance inhibition control circuit 1002 outputs the received request to the multiplexer 1017 of the assignment controller 1013. For example, the multiplexer 1017 outputs to the buffer 1018 requests which have been received from multiple request issuing circuits 523. The buffer 1018 temporarily stores the received requests and outputs the requests to the assigning circuit 1019. For example, the assigning circuit 1019 assigns the requests to the buffers 1034 of the router port unique circuits 903 for corresponding paths. The buffer 1034 of each of the router port unique circuits 903 temporarily stores the received request, and outputs the request via the port 1035 to the outside of the CPU 512.

For example, it is assumed that after the request issuing circuit 523 issues a request and the request is transmitted toward a transmission destination node, no response is made to the request, and the timer 524 has timed out. In this case, the setting circuit 525 sets a failure node flag in the failure node list 550 provided at the pipe 522 that corresponds to the node as the request transmission destination to logical "1". Therefore, after that, a request is inhibited from being issued to the node. Regarding the request that has timed out, the interruption notification circuit 527 transmits an interruption notification to the core 515. The timer for counting the processing monitoring time of the CPU 512 held in the core 515 is reset, and therefore a situation in which the building block 501 goes down due to timeout of the processing monitoring time of the CPU may be avoided.

An abnormality of a path may include, for example, a failure in the crossbar switch 502 and a failure in the port 1035.

For example, in the case where a failure has occurred in a path, the port 1035 of the router port unique circuit 903 receives a fatal packet which indicates the failure in the path from the crossbar switch 502. The fatal packet received at the port 1035 is processed by the module circuit 1039. The path failure detection circuit 1031 detects that the fatal packet has been received at the port 1035, and notifies the abnormality notification circuit 1033 of the abnormality of the path. The port error detection circuit 1032 detects the abnormality of the connected port, and notifies the abnormality notification circuit 1033 of the abnormality of the port. For example, the port error detection circuit 1032 may detect an abnormality of a port by detecting link-down (LDW) or fatal ordered set (FOS) of the port 1035. Link-down or FOS may be, for example, a notification which indicates an abnormality of a port transmitted from the crossbar switch 502. When detecting the abnormality of the port, the port error detection circuit 1032 outputs a disposal signal to the disposal circuit 1036. When the disposal signal is input to the disposal circuit 1036, the disposal circuit 1036 disposes of a request so that the buffer 1034 does not become full. When an abnormality is reported from the path failure detection circuit 1031 or the port error detection circuit 1032, the abnormality notification circuit 1033 transmits an individual path abnormality detection notification which indicates an abnormality of a path to the degeneration control circuit 1011 of the router common circuit 902. The abnormality notification circuit 1033 may include, for example, a logical circuit: OR. For example, the router port unique circuit 903 may be provided for each path, and an individual path abnormality detection notification is information which indicates an abnormality of each path.

The degeneration control circuit 1011 of the router common circuit 902 includes, for each path, the degeneration temporary holding unit 1015 and the degeneration holding unit 1016. When receiving an individual path abnormality detection notification from any of the abnormality notification circuits 1033 of the router port unique circuits 903 provided for individual paths, the degeneration control circuit 1011 sets the degeneration temporary holding unit 1015 which corresponds to the path to logical "1". For example, in the case where an individual path abnormality detection notification is received from the router port unique circuit 903 #0 system, the degeneration control circuit 1011 sets the degeneration temporary holding unit 1015 which corresponds to the path #0 system to logical "1". Furthermore, when receiving the individual path abnormality detection notification, the degeneration control circuit 1011 outputs the abnormality detection notification to the degeneration timing control circuit 1001 of the home agent circuit 520.

When receiving the abnormality detection notification from the degeneration control circuit 1011, for example, the degeneration timing control circuit 1001 of the home agent circuit 520 activates the drain timers 1003 (for example, drain timers #1 and #2). If the timers have already been activated, following abnormality detection notifications are ignored. When receiving the abnormality detection notification, the degeneration timing control circuit 1001 outputs to the request issuing circuit 523 an FNL setting inhibition signal for inhibiting the setting circuit 525 from setting a failure node flag in the failure node list 550 to logical "1". When receiving the FNL setting inhibition signal, the request issuing circuit 523 sets setting inhibition information for requests accumulated in the buffer of the request issuing circuit 523 by the time when the FNL setting inhibition signal is received. Setting inhibition information may be, for example, an FNL update inhibition flag which is used for inhibiting the setting circuit 525 from updating an FNL, and may be stored in, for example, a storing circuit provided at the request issuing circuit 523. For example, in the case where an FNL update inhibition flag is set, the setting circuit 525 inhibits setting of a failure node flag for the node as a request transmission destination. Therefore, even in the case where the request has timed out, if the cause of the timeout is a path failure, setting of the failure node flag is not performed.

Furthermore, when receiving the abnormality detection notification, the degeneration timing control circuit 1001 starts to count the drain timer #1, and outputs a packet issuance inhibition signal to the packet issuance inhibition control circuit 1002. The valid circuit 1004 monitors completion of counting by the drain timer #1 for a predetermined period of time. When the valid circuit 1004 detects completion of counting, the degeneration timing control circuit 1001 stops output of the packet issuance inhibition signal. When receiving the packet issuance inhibition signal, the packet issuance inhibition control circuit 1002 inhibits the request issuing circuit 523 from issuing a request. The packet issuance inhibition control circuit 1002 may include, for example, a logical circuit: AND. When receiving the abnormality detection notification, the degeneration timing control circuit 1001 starts counting of the drain timer #2. The valid circuit 1004 monitors completion of counting by the drain timer #2 for a predetermined period of time. When the valid circuit 1004 detects completion of counting, the degeneration timing control circuit 1001 outputs to the degeneration control circuit 1011 of the router common circuit 902 a degeneration execution response which requests degeneration of the path in which the abnormality is detected. The predetermined period of time during which counting is performed by the drain timer #2 is, for example, a waiting time from reception of the abnormality detection notification from the router port unique circuit 903 to entry to a state in which a path may be degenerated by the router common circuit 902.

When receiving the degeneration execution response, for example, the degeneration control circuit 1011 releases setting of the degeneration temporary holding unit 1015 which is set for the path to be degenerated. When receiving the degeneration execution response, the degeneration control circuit 1011 sets information which indicates degeneration of the path in the degeneration holding unit 1016 which corresponds to the path to be degenerated, for example, in the case where no information which indicates degeneration is set for any of the degeneration holding unit 1016 for each path. In this case, the degeneration control circuit 1011 outputs a degeneration instruction signal for instructing the assigning circuit 1019 of the assignment controller 1013 to degenerate the path to be degenerated.

The assigning circuit 1019 of the assignment controller 1013 assigns requests input to the buffer 1018 to the buffers 1034 of the router port unique circuits 903 for corresponding paths. For example, the assigning circuit 1019 may assign a request to the path #0 or the path #1. For example, in the case where a degeneration instruction signal for issuing an instruction for degeneration is received from the degeneration control circuit 1011, the assigning circuit 1019 assigns a request to a path for which degeneration is not instructed.

In the case where a failure in a path is detected, the degeneration timing control circuit 1001 outputs an FNL setting inhibition signal to the request issuing circuit 523. Therefore, setting of the failure node list 550 by the setting circuit 525 is inhibited. For example, in the case where timeout of a request is caused by a path failure, a situation in which a node as a request transmission destination is set as a failure node in the failure node list 550 may be avoided.

Figure 11:
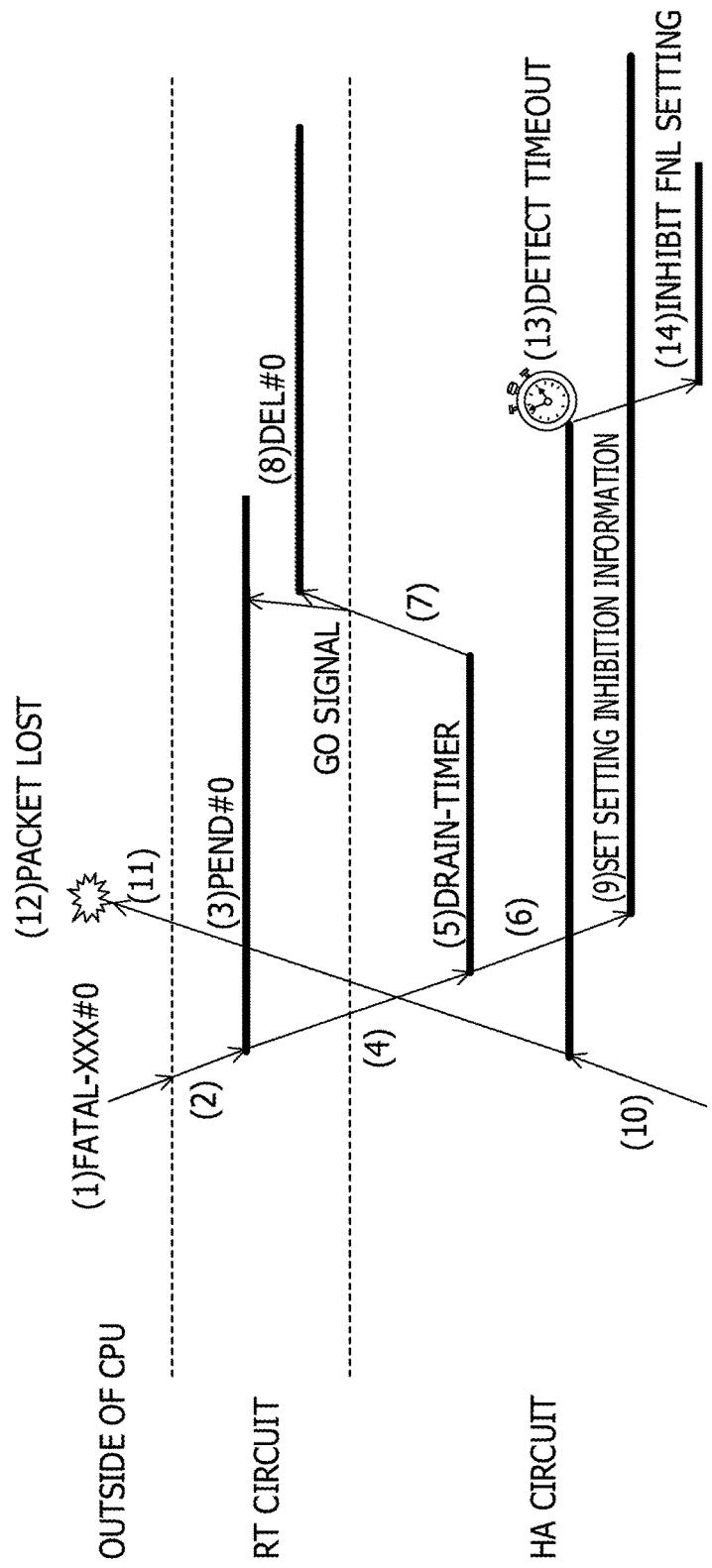
FIG. 11 illustrates an example of an operation for inhibiting setting of a failure node flag in a case where a failure in a path is detected.

FIG. 11 illustrates an example of an operation for inhibiting setting of a failure node flag in the case where a failure in a path is detected. For example, in the case where an abnormality of a path #0 is detected by the crossbar switch 502, the crossbar switch 502 transmits a fatal packet (FATAL-XXX#0 of FIG. 11) to the router port unique circuit 903 corresponding to the path #0 ((1) of FIG. 11). When receiving the fatal packet, the router port unique circuit 903 transmits an individual path abnormality detection notification to the degeneration control circuit 1011 of the router common circuit 902 ((2) of FIG. 11). When receiving the individual path abnormality detection notification, the degeneration control circuit 1011 sets the degeneration temporary holding unit 1015 of the corresponding path #0 to logical "1" ((3) of FIG. 11). When receiving the individual path abnormality detection notification, the degeneration control circuit 1011 outputs an abnormality detection notification to the degeneration timing control circuit 1001 of the home agent circuit 520 ((4) of FIG. 11). When receiving the abnormality detection notification, the degeneration timing control circuit 1001 activates the drain timers 1003 (for example, drain timers #1 and #2) ((5) of FIG. 11). When receiving the abnormality detection notification, the degeneration timing control circuit 1001 transmits an FNL setting inhibition signal to the request issuing circuit 523 ((6) of FIG. 11). When receiving the abnormality detection notification, the degeneration timing control circuit 1001 keeps outputting a packet issuance inhibition signal to the packet issuance inhibition control circuit 1002 until the drain timer #1 completes counting for a predetermined period of time. When the drain timer #2 completes counting for a predetermined period of time, the degeneration timing control circuit 1001 outputs to the degeneration control circuit 1011 a degeneration execution response for requesting for execution of degeneration of the path in which the failure is detected ((7) of FIG. 11). When receiving the generation execution response, the degeneration control circuit 1011 sets the degeneration temporary holding unit 1015 #0 to logical "0". When receiving the degeneration execution response, in the case where neither the degeneration holding unit #0 nor the degeneration holding unit #1 indicates logical "1", the degeneration control circuit 1011 sets the degeneration holding unit #0 of the path #0 in which the path failure is detected to logical "1" ((8) of FIG. 11), and instructs the assignment controller 1013 to perform degeneration. When receiving the FNL setting inhibition signal, the request issuing circuit 523 sets setting inhibition information for requests accumulated in buffers in the request issuing circuit 523 by the time when the FNL setting inhibition signal is input ((9) of FIG. 11).

For example, in the case where the core 515 inputs a request to the request issuing circuit 523, the request issuing circuit 523 issues a request, and activates the timer 524 ((10) of FIG. 11). The issued request is output to a transmission destination node ((11) of FIG. 11). In this case, for example, a failure has occurred in the node to which the request has been transmitted, and a packet is lost ((12) of FIG. 11). As a result, the request issued by the request issuing circuit 523 has timed out ((13) of FIG. 11). Also in this case, setting inhibition information is set for the request, and therefore the setting circuit 525 inhibits setting of the failure node list 550 ((14) of FIG. 11).

Therefore, even in the case where the request has timed out, if a path failure is detected, setting of the failure node list 550 by the setting circuit 525 is inhibited. For example, in the case where timeout of a request has occurred, control for inhibiting a request from being issued to the transmission destination node in which the timeout of a request has occurred may be performed by regarding the node to which the request has been transmitted as a failure node. In this case, for example, all the transmission destination nodes to which a request is to be transmitted through the same path are determined to be failure nodes. Even if communication may be continued by degenerating the failure path, communication with the transmission destination nodes may be inhibited. For example, if a path failure is detected, setting of the failure node list 550 is inhibited. Therefore, for example, a situation in which a node to which a different request is transmitted through the failure path is falsely determined to be a failure node and a request is inhibited may be suppressed. For example, by degenerating the failure path, communication may be continued using another path.

In the case where a request issued to a transmission destination node has timed out, the setting circuit 525 sets a failure node flag in the failure node list 550 which corresponds to the transmission destination node to logical "1". In the case where the failure node flag is set to logical "1", after that, the issuance inhibition circuit 526 inhibits a request from being issued to the node. Therefore, a situation in which a request is issued to the failure node multiple times and requests waiting for a response are accumulated may be suppressed. A situation in which the resources within the CPU 112 run out and a normal node slows down and turns into an abnormal node may be suppressed. For example, in the case where a request has timed out, if a path failure is reported, setting to the failure node list 550 is inhibited. Therefore, a situation in which in the case where a path failure has occurred, a transmission destination node is falsely determined to be a failure node and a request is inhibited from being issued to the node in accordance with the failure node list 550 may be suppressed. Regarding the request that has timed out, the interruption notification circuit 527 transmits an interruption notification to the core 515. Therefore, the timer for counting the processing monitoring time of the CPU 512 held at the core 515 is reset, and therefore a situation in which timeout of the processing monitoring time of the CPU causes the building block 501 to go down may be avoided.

For example, the pipe 522 provided inside the CPU stores the failure node list 550, and the pipe 522 controls issuance and inhibition of a request in accordance with the failure node list 550. For example, a second failure node list 1202 which may be set by firmware or software operating at the building block 501 may be used.

Figure 12:
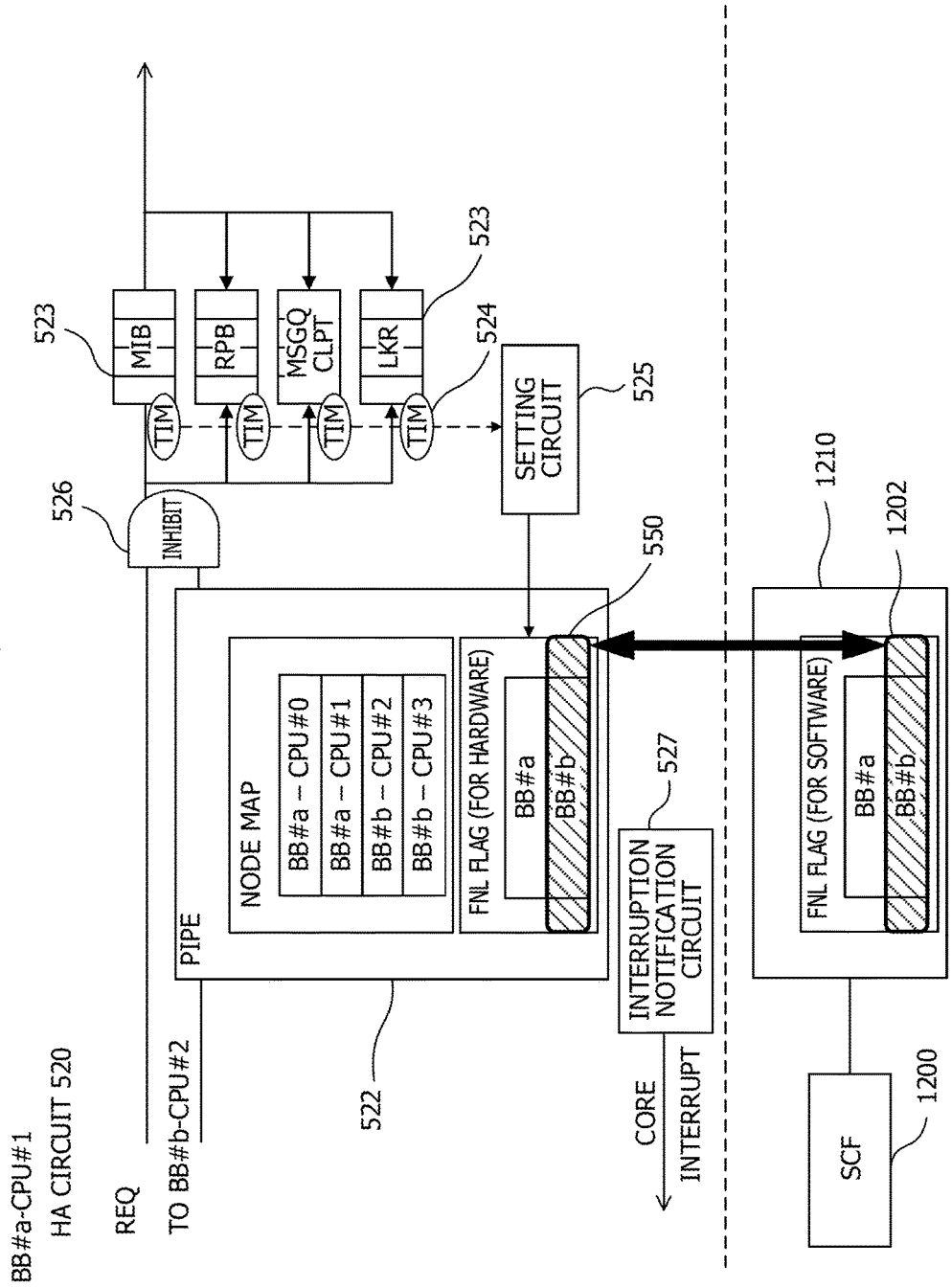
FIG. 12 illustrates an example of synchronization between failure node lists by the home agent circuit and a system control facility (SCF)

FIG. 12 illustrates an example of synchronization between failure node lists by a home agent circuit and a system control facility (SCF). As illustrated in FIG. 12, the home agent circuit 520 includes, for example, the pipe 522, the request issuing circuit 523, the timer 524, the setting circuit 525, the issuance inhibition circuit 526, and the interruption notification circuit 527.

The building block 501 which includes the CPU 512 includes a device which executes firmware or software called an SCF 1200, and a storage unit 1210. For example, the SCF 1200 may be a monitoring unit which monitors the state of the building block 501, such as the state of the CPU 512 and the memory 511 of the building block 501 and the temperature inside the building block 501. Furthermore, the SCF 1200 may be, for example, implemented by a field-programmable gate array (FPGA) provided at the building block 501. In another embodiment, the SCF 1200 may implement firmware or software when a processor within the SCF executes a program within the storage unit 1210. The SCF 1200 may write and read the second failure node list 1202 which is stored in the storage unit 1210. Failure node flags in the second failure node list 1202 may be, for example, synchronized with the failure node list 550. For example, the setting circuit 525 changes setting of failure node flags in the failure node list 550. In this case, the interruption notification circuit 527 outputs an interruption notification to the core 515, and the SCF 1200 changes setting of failure node flags in the second failure node list 1202 in the storage unit 1210 in the same manner, in response to the notification from the core 515. In the case where the SCF 1200 changes setting of failure node flags in the second failure node list 1202, the SCF 1200 notifies the core 515 of the CPU 512 of the change of the setting, and, for example, the setting circuit 525 changes the failure node flags in the same manner, in accordance with an instruction by the core 515. Accordingly, synchronization between the failure node list 550 and the second failure node list 1202 is achieved.

In the case where, for example, setting of the failure node list 550 of the pipe 522 within the CPU 512 is changed, the SCF 1200 notifies the CPU 512 of a different building block 501 of the change via a communication path. For example, a request issued by the CPU 512 of a certain building block 501 has timed out, and the CPU 512 sets a failure node flag for the transmission destination node in the failure node list 550. In this case, the SCF 1200 within the same node performs setting for the second failure node list 1202 in a similar manner, and notifies the SCF 1200 of a different node of setting of the failure node flag. The SCF 1200 of the different node which has been notified of the setting sets a failure node flag in the second failure node list 1202 within the same node, in accordance with the notification. When setting of the second failure node list 1202 is changed, the change is synchronized with the failure node list 550 of the CPU 512 in the same node. Accordingly, a situation in which a different node transmits an unnecessary request to a failure node may be inhibited.

For example, a failure node flag may be set when the power supply of a certain node is forcibly turned off. For example, there is a function called forced termination in which the power supply of a node is forcibly turned off due to a defect in software or an operation system (OS). For example, in a shared memory system, if a node is forcibly disconnected, the node looks like a failure node when viewed from a different node, which is not desirable. In order to avoid this, the second failure node list 1202 may be used.

Figure 13:
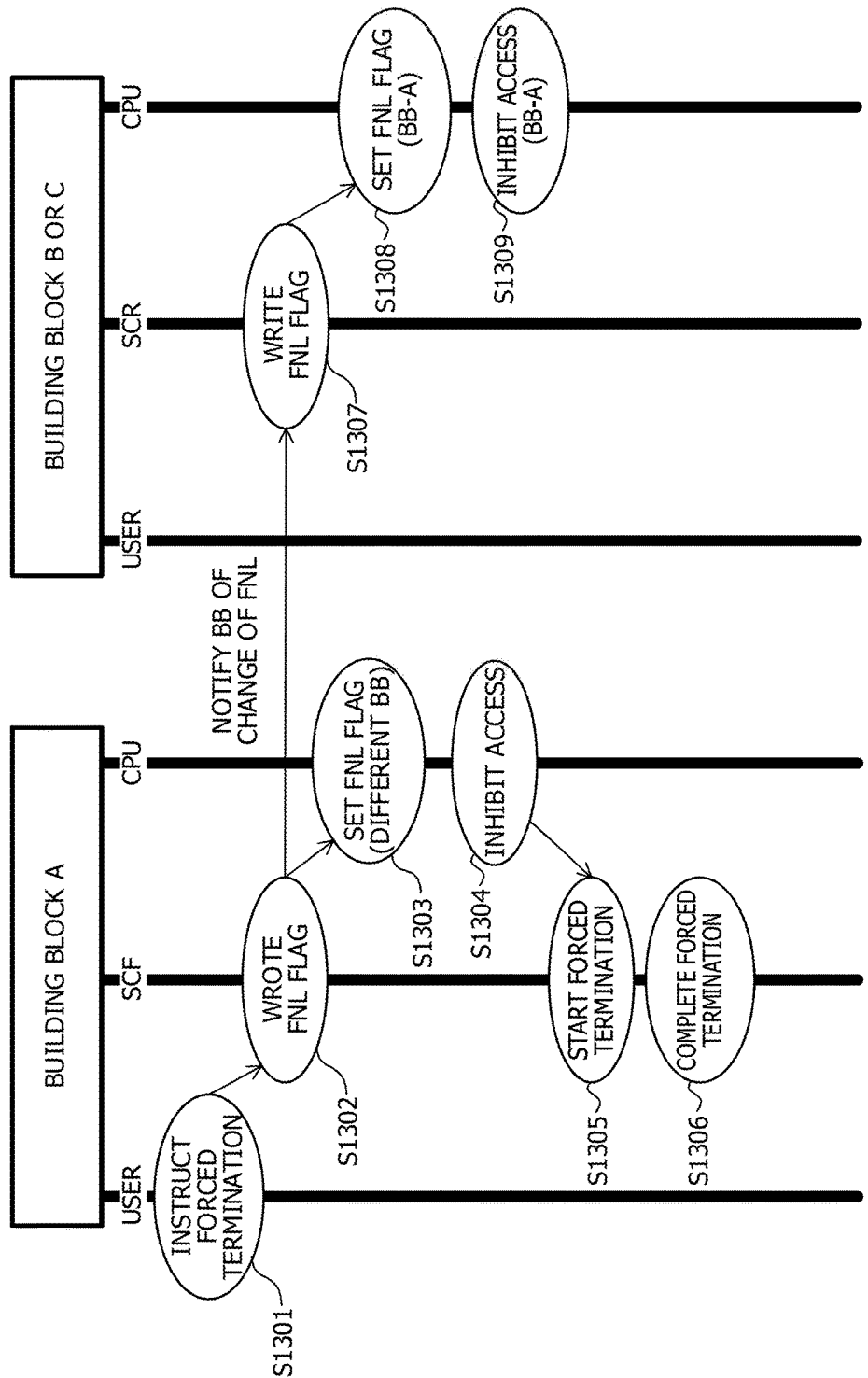
FIG. 13 illustrates an example of an operation in a case where a node is forcibly terminated in the information processing system.

FIG. 13 illustrates an example of an operation in the case where a node is forcibly terminated in the information processing system. In S1301, a user inputs an instruction for forced termination to the SCF 1200 operating in a building block A. In S1302, the SCF 1200 sets a failure node flag in the second failure node list 1202 which corresponds to a different building block 501 (for example, a building block B or C) operating within the information processing system 500 to logical "1". The SCF 1200 transmits to the SCF 1200 of the different building block (for example, B or C) within the information processing system 500 an instruction to set a failure node flag in the second failure node list 1202 which corresponds to the building block A to logical "1".

The SCF 1200 notifies the CPU 512 within the same building block A of the change of setting performed for the second failure node list 1202. Therefore, the change of setting performed for the second failure node list 1202 is also performed for the failure node list 550 of the CPU 512, and the failure node list 550 is synchronized with the second failure node list 1202 so that they have the same contents (S1303).

In accordance with synchronization of the failure node list 550, a request is inhibited from being issued to the different building block 501 (S1304). In S1305, the SCF 1200 starts forced termination, and forced termination is completed in S1306.

Furthermore, in S1307, the SCF 1200 of the different building block 501 receives a notification indicating an instruction for changing the failure node flag which corresponds to the building block A to logical "1" from the building block A. The SCF 1200 of the different building block 501 sets the failure node flag in the second failure node list 1202 which corresponds to the building block A to logical "1". The SCF 1200 notifies the CPU 512 within the same building block of the change of setting, and the change of setting for the second failure node list 1202 is also applied to the failure node list 550 (S1308). The failure node list 550 is synchronized with the second failure node list 1202 so that they have the same contents. The CPU 512 of the different building block 501 is inhibited from accessing the building block A which has been forcibly terminated (S1309).

As described above, before execution of forced termination, the SCF 1200 instructs the SCF 1200 of the different building block 501 to change setting of a failure node flag in the second failure node list 1202. In accordance with the instruction, the second failure node list 1202 of the SCF 1200 is changed, and the change of setting is reflected in the failure node list 550 in the CPU 512 of the different building block 501. Accordingly, issuance of an unnecessary request, such as issuance of a request to the CPU 512 of the building block 501 which has been forcibly terminated from the CPU 512 of the different building block 501 operating at the information processing system 500, may be suppressed. Safety at the time of execution of forced termination may be increased.

Figure 14:
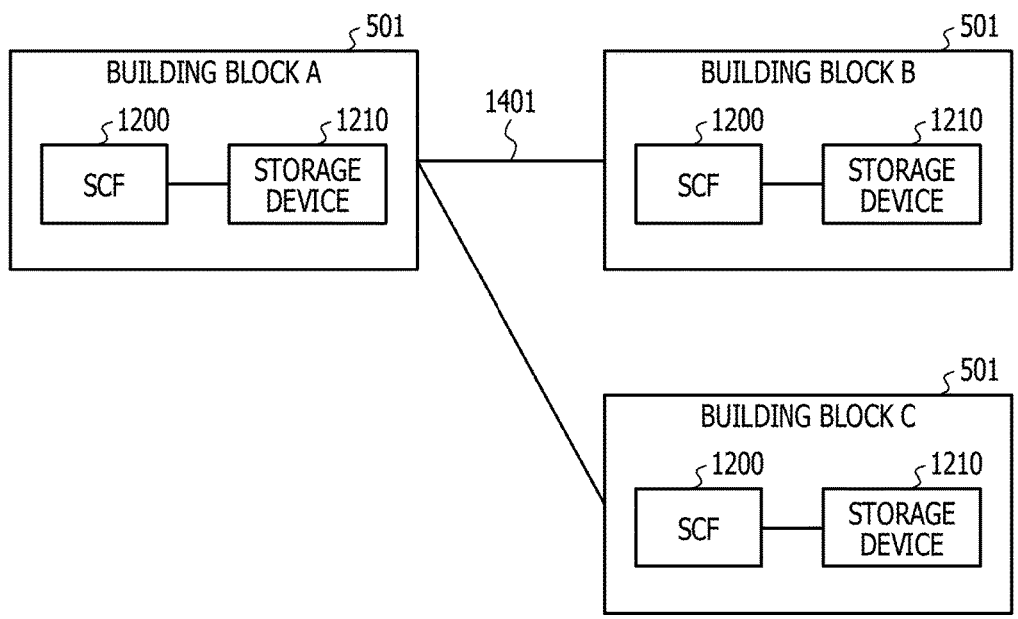
FIG. 14 illustrates an example of connection among building blocks in the information processing system.

FIG. 14 illustrates an example of connection among building blocks in the information processing system. Communication among the SCFs 1200 may be performed by a communication cable 1401 which allows connection among the building blocks 501, as illustrated in FIG. 14. For example, a local area network (LAN) cable may be used as the communication cable 1401.

Figure 15:
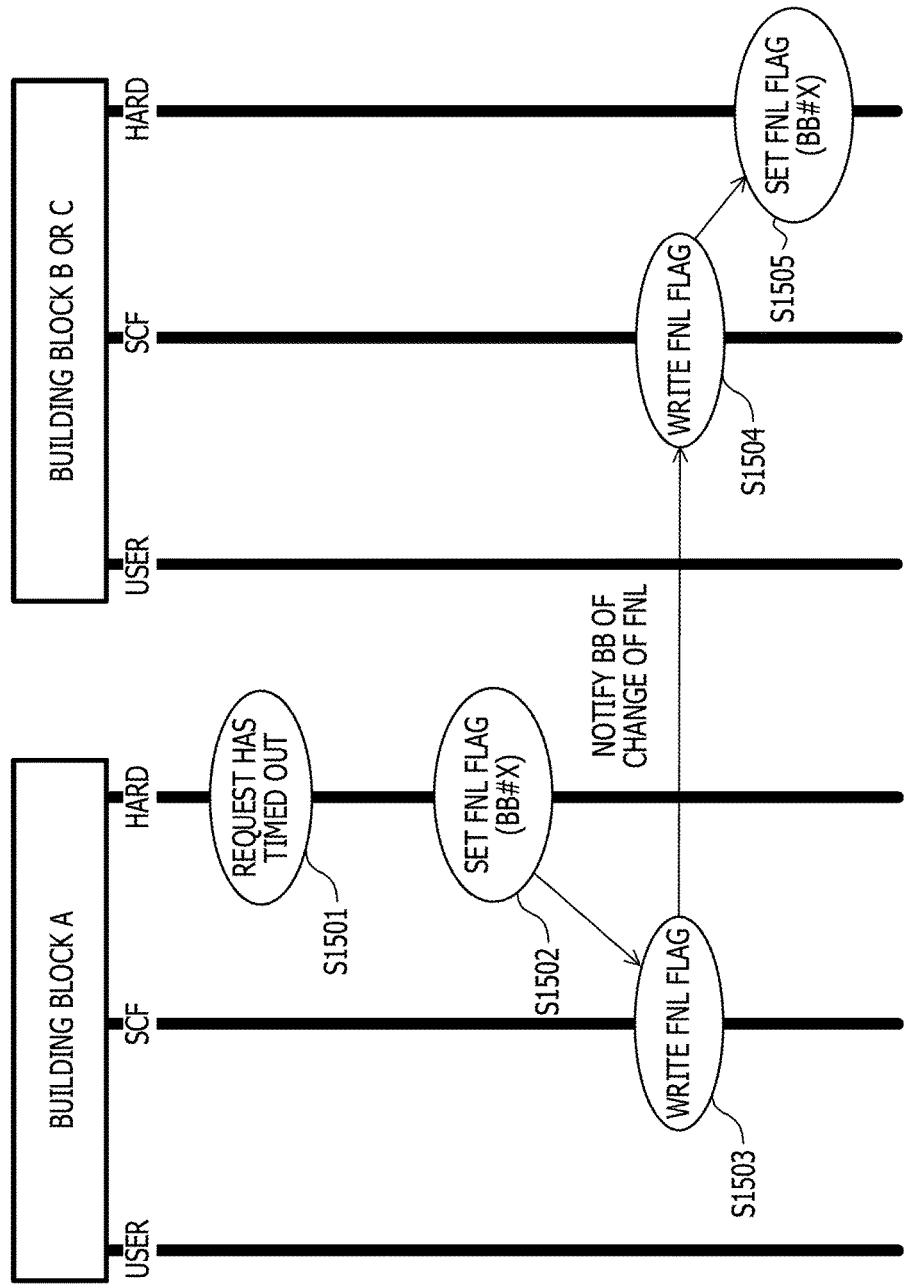
FIG. 15 illustrates an example of use of a second failure node list in the information processing system.

The case where forced termination is performed is illustrated in FIG. 13. FIG. 15 illustrates an example of use of a second failure node list in the information processing system. In S1501, the CPU 512 of the building block A detects timeout of a request which has been transmitted to a building block X. In S1502, the CPU 512 sets a failure node flag in the failure node list 550 which corresponds to the building block X to logical "1", and notifies the SCF 1200 of the building block A of the change of setting. In S1503, the SCF 1200 of the building block A sets a failure node flag in the second failure node list 1202 which corresponds to the building block X to logical "1", in accordance with the notified change of setting. The SCF 1200 of the building block A notifies the SCF 1200 of a different building block 501 (for example, B or C) within the information processing system 500 of the change. In S1504, the SCF 1200 of the different building block 501 sets the failure node flag in the second failure node list 1202 which corresponds to the building block X to logical "1", in accordance with the notified change of setting. The SCF 1200 of the different building block 501 notifies the CPU 512 of the same building block 501 of the notified change of setting. In S1505, the CPU 512 which has been notified of the change of setting sets the failure node flag in the failure node list 550 which corresponds to the building block X to logical "1", in accordance with the notified change of setting. Accordingly, for example, in the case where a failure node flag for a different failure node is set for a certain node within the information processing system 500 in the failure node list 550, the setting is also reflected in a different node in the information processing system 500. Therefore, a situation in which the different node transmits a request to a failure node is suppressed. For example, the SCF 1200 includes the second failure node list 1202 which may be set by firmware or software. Therefore, various types of processing based on the second failure node list 1202 using resources such as a communication path which may be controlled may be achieved by software provided at the building block 501.

For example, processing is controlled by setting logical "1" or logical "0" for a failure node flag, the degeneration temporary holding unit 1015, the degeneration holding unit 1016, and the like. For example, in order to perform similar control, different values may be set for the failure node flag, the degeneration temporary holding unit 1015, and the degeneration holding unit 1016.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A node comprising:
an arithmetic processing device; and
a first memory,
the arithmetic processing device includes:
a processor core configured to output a request to issue a first request to a second memory provided in a first node included in a plurality of nodes;
a storing circuit configured to store a first failure node list in which first information indicating that a failure has occurred or second information indicating that no failure has occurred is set for each of a plurality of nodes;
a request issuing circuit configured to issue, based on the request from the processor core, the first request to the second memory;
a setting circuit configured to set the first information for the first node in the first failure node list in a case where the first request has timed out; and
an issuance inhibition circuit configured to inhibit, when a new request to issue a second request to the second memory is output from the processor core, the new request in a case where the first information is set for the first node in the first failure node list in such a manner that the second request is not issued by the request issuing circuit.

2. The node according to claim 1, wherein the issuance inhibition circuit issues, when the new request to issue the second request to the second memory is output from the processor core, the new request in a case where the second information is set for the first node in the first failure node list in such a manner that the second request is issued by the request issuing circuit.

3. The node according to claim 1, wherein the request issuing circuit sets, in a case where an abnormality of a communication path to a second node among the plurality of nodes is reported, setting inhibition information for a third request which is to be transmitted to the second node, and wherein the setting circuit inhibits the first information from being set for the second node in the first failure node list.

4. The node according to claim 1, wherein the arithmetic processing device includes: a monitor, and a storage configured to store a second failure node list in which the first information or the second information is set for each of the plurality of nodes, and wherein the arithmetic processing device and the monitor operate, in a case where setting of one of the first failure node list and the second failure node list is changed, in such a manner that the change of setting is reflected in the other one the first failure node list and the second failure node list.

5. The node according to claim 4, wherein the monitor issues, in a case where the setting circuit sets the first information for a third node among the plurality of nodes in the first failure node list, an instruction to set the first information for the third node in the second failure node list of a different node among the plurality of nodes.

6. The node according to claim 1, wherein the arithmetic processing device includes an interruption notification circuit configured to transmit, in a case where the first request has timed out, an interruption notification for releasing monitoring a processing time for the first request to the processor core.

7. An arithmetic processing device comprising:
a processor core configured to output a request to issue a first request to a memory provided in a first node included in a plurality of nodes in a shared memory system;
a request issuing circuit configured to issue, based on the request from the processor core, the first request to the memory;
a storing circuit configured to store a first failure node list in which first information indicating that a failure has occurred or second information indicating that no failure has occurred is set for each of the plurality of nodes;
a setting circuit configured to set, in a case where the first request has timed out, the first information for the first node in the first failure node list; and
an issuance inhibition circuit configured to inhibit, when a new request to issue a second request to the memory is output from the processor core, the new request in a case where the first information is set for the first node in the first failure node list in such a manner that the second request is not issued by the request issuing circuit.

8. The arithmetic processing device according to claim 7, wherein the issuance inhibition circuit issues the new request in a case where the second information is set for the first node in the first failure node list in such a manner that the second request is issued by the request issuing circuit.

9. The arithmetic processing device according to claim 7, wherein the request issuing circuit sets, in a case where an abnormality of a communication path to a second node among the plurality of nodes is reported, setting inhibition information for a third request which is to be transmitted to the second node, and wherein the setting circuit inhibits the first information from being set for the second node in the first failure node list.

10. The arithmetic processing device according to claim 7, wherein the arithmetic processing device includes: a monitor, and a storage configured to store a second failure node list in which the first information or the second information is set for each of the plurality of nodes, and wherein the arithmetic processing device and the monitor operate, in a case where setting of one of the first failure node list and the second failure node list is changed, in such a manner that the change of setting is reflected in the other one the first failure node list and the second failure node list.

11. The arithmetic processing device according to claim 10, wherein the monitor issues, in a case where the setting circuit sets the first information for a third node among the plurality of nodes in the first failure node list, an instruction to set the first information for the third node in the second failure node list of a different node among the plurality of nodes.

12. The arithmetic processing device according to claim 7, wherein the arithmetic processing device includes an interruption notification circuit configured to transmit, in a case where the first request has timed out, an interruption notification for releasing monitoring a processing time for the first request to the processor core.

13. An arithmetic processing method comprising:
    storing a first failure node list in which first information indicating that a failure has occurred or second information indicating that no failure has occurred is set for each of a plurality of nodes in a shared memory system;
    outputting, by a processor core in an arithmetic processing device, a request to issue a first request to a memory provided in a first node included in the plurality of nodes;
    issuing, based on the request from the processor core, the first request to the memory provided at the first node;
    setting, in a case where the first request has timed out, first information for the first node in the first failure node list; and
    inhibiting, when a new request to issue a second request to the memory is generated in the processor core, the new request in a case where the first information is set for the first node in the first failure node list in such a manner that the second request is not issued from the arithmetic processing device.

14. The arithmetic processing method according to claim 13, further comprising:
    issuing, when the new request to issue the second request to the memory is generated in the processor core, the new request in a case where the second information is set for the first node in the first failure node list in such a manner that the second request is issued from the arithmetic processing device.

15. The arithmetic processing method according to claim 13, further comprising:
    setting, in a case where an abnormality of a communication path to a second node among the plurality of nodes is reported, setting inhibition information for a third request which is to be transmitted to the second node: and inhibiting the first information from being set for the second node in the first failure node list.

16. The arithmetic processing method according to claim 13, further comprising:
    operating, in a case where setting of one of the first failure node list and a second failure node list in which the first information or the second information is set for each of the plurality of nodes is changed, in such a manner that the change of setting is reflected in the other one the first failure node list and the second failure node list.

17. The arithmetic processing method according to claim 16, further comprising:
    issuing, when the first information is set for a third node among the plurality of nodes in the first failure node list, an instruction to set the first information for the third node in the second failure node list of a different node among the plurality of nodes.

18. The arithmetic processing method according to claim 13, further comprising: transmitting, in a case where the first request has timed out, an interruption notification for releasing monitoring a processing time for the first request.

* * * * *